(12) United States Patent
Katsura et al.

(10) Patent No.: US 10,931,221 B2
(45) Date of Patent: Feb. 23, 2021

(54) ROTATIONAL ELECTRIC MACHINE, DRIVE CONTROL SYSTEM OF VEHICLE, AND STORAGE MEDIUM HAVING PROGRAM EXECUTED BY OR CAUSED TO BE EXECUTED BY CONTROL APPARATUS OF ROTATIONAL ELECTRIC

(71) Applicant: EXEDY Corporation, Neyagawa (JP)

(72) Inventors: Hitoshi Katsura, Neyagawa (JP); Taichi Kitamura, Neyagawa (JP); Kimitaka Uemura, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 16/584,325

(22) Filed: Sep. 26, 2019

(65) Prior Publication Data

US 2020/0112282 A1    Apr. 9, 2020

(30) Foreign Application Priority Data

Oct. 3, 2018  (JP) .............................. JP2018-188326
Jul. 10, 2019  (JP) .............................. JP2019-128403

(51) Int. Cl.
  *H02P 1/00*   (2006.01)
  *H02P 27/08*  (2006.01)
  (Continued)

(52) U.S. Cl.
  CPC ........... *H02P 27/08* (2013.01); *H02K 1/2706* (2013.01); *H02K 11/33* (2016.01); *B60K 6/26* (2013.01); *B60L 50/60* (2019.02); *B60Y 2200/91* (2013.01); *B60Y 2200/92* (2013.01); *B60Y 2400/60* (2013.01)

(58) Field of Classification Search
  CPC ...... H02P 6/16; H02P 6/10; H02P 6/20; H02P 23/0027; H02P 23/14; H02P 6/08
  See application file for complete search history.

(56) References Cited

U.S. PATENT DOCUMENTS

2003/0178973 A1  9/2003  Maehara
2004/0145355 A1  7/2004  Taniguchi
(Continued)

FOREIGN PATENT DOCUMENTS

EP       1424764 A2      6/2004
JP       2016-105696 A   6/2016

OTHER PUBLICATIONS

Extended European Search Report dated Jan. 7, 2020 for the corresponding European Patent Application No. 19200874.6, 6 pp.

*Primary Examiner* — Karen Masih
(74) *Attorney, Agent, or Firm* — United IP Counselors, LLC

(57) ABSTRACT

A rotational electric machine includes a stator configured to generate a rotation magnetic field in response to alternating current; a rotor configured to rotate in response to the rotation magnetic field; a field coil configured to excite the rotor in response to direct current; an acquisition unit configured to acquire manipulation information related to a torque generated by or caused to be generated by the rotor and a rotational state of the rotor; and a motor characteristic control unit configured to control the direct current based on the manipulation information and the rotational state acquired by the acquisition unit to control a motor characteristic.

13 Claims, 8 Drawing Sheets

(51) Int. Cl.
*H02K 11/33* (2016.01)
*H02K 1/27* (2006.01)
*B60L 50/60* (2019.01)
*B60K 6/26* (2007.10)

(56) References Cited

U.S. PATENT DOCUMENTS

2006/0192533 A1   8/2006  Kimura et al.
2019/0199269 A1*  6/2019  Okuhata ................. H02P 29/64

* cited by examiner

ROTATIONAL ELECTRIC MACHINE, DRIVE CONTROL SYSTEM OF VEHICLE, AND STORAGE MEDIUM HAVING PROGRAM EXECUTED BY OR CAUSED TO BE EXECUTED BY CONTROL APPARATUS OF ROTATIONAL ELECTRIC

CROSS-REFERENCE TO RELATED APPLICATIONS

This application claims priority to 2018-188326, filed Oct. 3, 2018 and Japanese Patent Application No. 2019-128403, filed Jul. 10, 2019. The contents of those applications are incorporated by reference herein in their entirety.

TECHNICAL FIELD

The present invention relates to a rotational electric machine, a drive control system of a vehicle, and a storage medium having a program executed by or caused to be executed by a control apparatus of a rotational electric machine.

BACKGROUND ART

JP 2016-105696 A proposes a permanent-magnet synchronous machine composed of a rotor and a stator.

BRIEF SUMMARY

Incidentally, when the permanent-magnet synchronous machine is used as a vehicle drive motor, the permanent magnet synchronous machine has a motor characteristic corresponding to the magnetic force of the permanent magnet. Here, the motor characteristic of a permanent-magnet synchronous machine (that is, a rotational electric machine) means an output characteristic about the relation between torque, rotational speed, and current obtained when a permanent-magnet synchronous machine is activated as a motor (that is, an electric motor). In the permanent-magnet synchronous machine, when the amount of magnetic flux by the permanent magnet is increased, the torque constant and the induced voltage constant are increased and thus the maximum value of the output torque is increased. However, the maximum value of the rotational speed is limited due to the balance with the power supply voltage. On the other hand, in the permanent-magnet synchronous machine, when the amount of magnetic flux by the permanent magnet is decreased, the torque constant and the induced voltage constant are decreased and thus the maximum value of the rotational speed can be increased. However, the maximum value of the output torque decreases. Therefore, in order to increase both the maximum value of the rotational speed and the maximum value of the output torque, it is necessary to equivalently change the motor characteristic by using a plurality of gear pairs, a mechanical transmission, or the like together with the permanent-magnet synchronous machine.

An object of the present invention is to provide a rotational electric machine capable of changing an output characteristic without providing a plurality of gear pairs or a mechanical transmission, a drive control system of a vehicle, and a storage medium having a program executed by or caused to be executed by a control apparatus of a rotational electric machine.

In order to achieve the object, the present invention is configured as follows.

A first aspect of the present invention provides a rotational electric machine including:

a stator configured to generate a rotation magnetic field in response to alternating current;

a rotor configured to rotate in response to the rotation magnetic field;

a field coil configured to excite the rotor in response to direct current;

an acquisition unit configured to acquire manipulation information related to a torque generated by or caused to be generated by the rotor and a rotational state of the rotor; and a motor characteristic control unit configured to control the direct current based on the manipulation information and the rotational state, which are acquired by the acquisition unit, to control a motor characteristic.

A second aspect of the present invention provides a drive control system of a vehicle including:

a rotational electric machine including a stator configured to generate a rotation magnetic field in response to alternating current, a rotor configured to rotate in response to the rotation magnetic field, and a field coil configured to excite the rotor in response to direct current;

a manipulation unit configured to be capable of accepting manipulation of the vehicle;

a rotation magnetic field control unit configured to control the rotation magnetic field based on manipulation accepted by the manipulation unit;

an acquisition unit configured to acquire manipulation information related to torque generated by or caused to be generated by the rotor from manipulation accepted by the manipulation unit, the acquisition unit being configured to acquire a rotational state from the rotor; and a motor characteristic control unit configured to control the direct current based on the manipulation information and the rotational state acquired by the acquisition unit to control a motor characteristic.

A third aspect of the present invention provides a program for causing a control apparatus, which is configured to control a rotational electric machine, the rotational electric machine including a stator configured to generate a rotation magnetic field in response to alternating current, a rotor configured to rotate in response to the rotation magnetic field, and field coil configured to excite the rotor in response to direct current, to perform operations including:

an acquisition step of acquiring manipulation information related to torque generated by or caused to be generated by the rotor and a rotational state of the rotor; and a motor characteristic control step of controlling the direct current based on the manipulation information and the rotational state, which are acquired, to control a motor characteristic.

A fourth aspect of the present invention provides a non-transitory computer-readable storage medium having the program.

According to a first aspect of the present invention, the rotational electric machine has a stator, a rotor, a field coil, an acquisition unit and a motor characteristic control unit. The stator is configured to generate a rotation magnetic field in response to alternating current. The rotor is configured to rotate in response to the rotation magnetic field. The field coil is configured to excite the rotor in response to direct current. The acquisition unit is configured to acquire manipulation information related to a torque generated by or caused to be generated by the rotor and a rotational state of the rotor. The motor characteristic control unit is configured to control the direct current based on the manipulation information and the rotational state acquired by the acquisition unit to control a motor characteristic. With this configuration, it is possible to achieve a rotational electric machine capable of satisfying the requested output characteristics as a vehicle by varying the motor characteristic without providing a plurality of gear pairs or a mechanical transmission.

According to a second aspect of the present invention, the drive control system has a rotational electric machine, a manipulation unit, a rotation magnetic field control unit, an acquisition unit and a motor characteristic control unit. The rotational electric machine has a stator configured to generate a rotation magnetic field in response to alternating current, a rotor configured to rotate in response to the rotation magnetic field, and a field coil configured to excite the rotor in response to direct current. The manipulation unit is configured to be capable of accepting manipulation of the vehicle; a rotation magnetic field control unit configured to control the rotation magnetic field based on manipulation accepted by the manipulation unit. The acquisition unit is configured to acquire manipulation information related to torque generated by or caused to be generated by the rotor from manipulation accepted by the manipulation unit, and acquire a rotational state from the rotor. The motor characteristic control unit is configured to control the direct current based on the manipulation information and the rotational state acquired by the acquisition unit to control a motor characteristic. With this configuration, it is possible to achieve a drive control system of a vehicle capable of varying the motor characteristics of the rotational electric machine without providing a plurality of gear pairs or a mechanical transmission.

According to a third aspect of the present invention, the program causes a control apparatus to perform operations. The control apparatus is configured to control a rotational electric machine including a stator configured to generate a rotation magnetic field in response to alternating current, a rotor configured to rotate in response to the rotation magnetic field, and a field coil configured to excite the rotor in response to direct current. The operations includes: an acquisition step of acquiring manipulation information related to torque generated by or caused to be generated by the rotor and a rotational state of the rotor; and a motor characteristic control step of controlling the direct current based on the manipulation information and the rotational state, which are acquired, to control a motor characteristic. With this configuration, a program capable of varying the motor characteristics of the rotational electric machine can be achieved without providing a plurality of gear pairs or a mechanical transmission.

According to the computer-readable storage medium of a fourth aspect of the present invention, the computer-readable storage medium can be achieved in which a program capable of varying the motor characteristics of the rotational electric machine is stored without providing a plurality of gear pairs or a mechanical transmission.

DETAILED DESCRIPTION

Hereinafter, one embodiment of the present invention will be described in detail with reference to the drawings.

First Embodiment

The drive control system and the rotational electric machine of the present invention can be applied to a hybrid electric vehicle (HEV), an electric vehicle (EV), and an apparatus including an electric motor as a component. In the first embodiment, a drive control system and a rotational electric machine for an electric vehicle (EV) will be described as an example.

Figure 1:
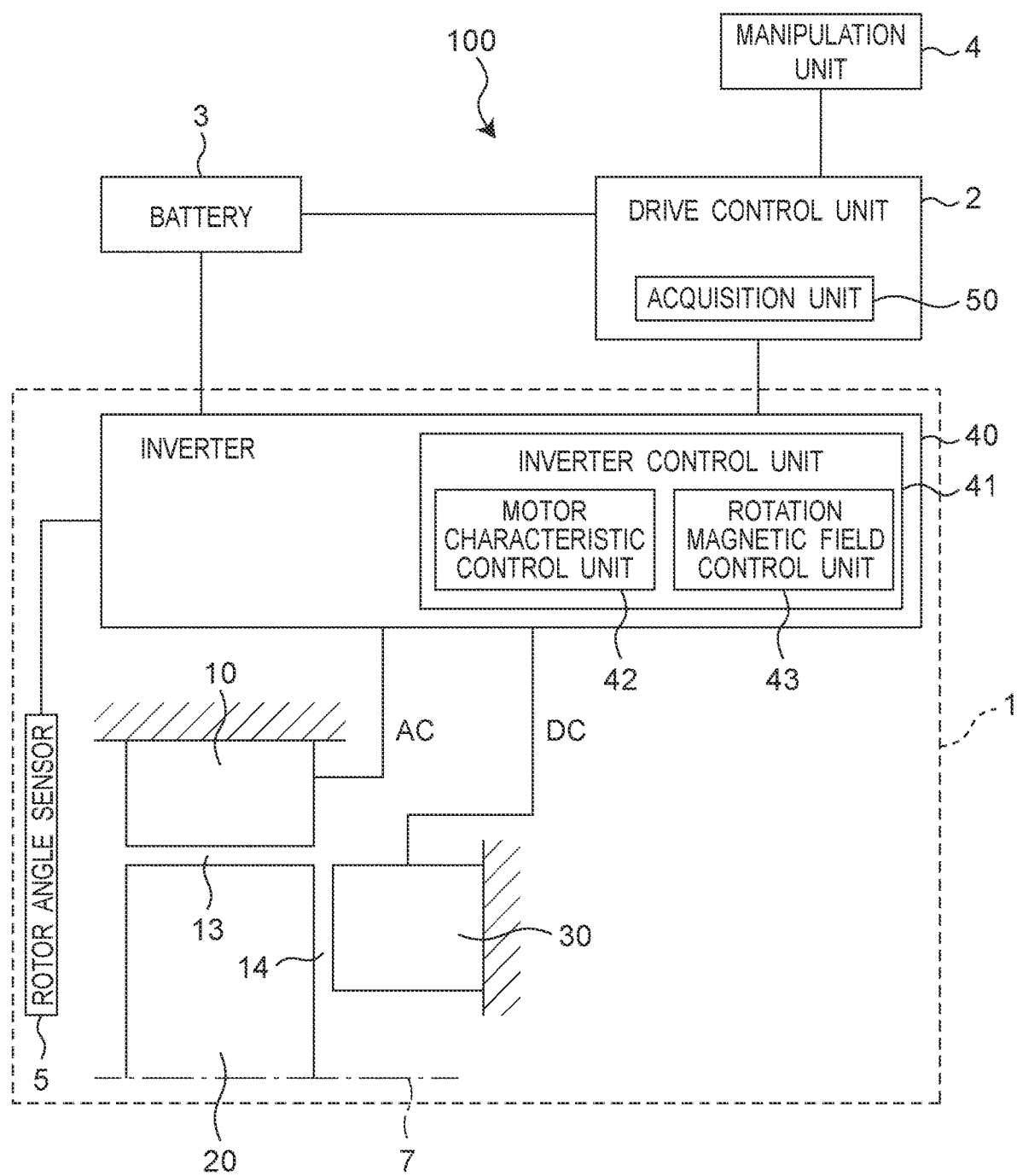
FIG. 1 is an explanatory diagram showing a configuration of a drive control system according to a first embodiment of the present invention.

As shown in FIG. 1, the drive control system 100 according to the first embodiment includes a rotational electric machine 1, a drive control unit 2 (an example of a control apparatus), a battery 3, and a manipulation unit 4.

The rotational electric machine 1 is attached to a drive wheel (not shown) directly or indirectly via a transaxle or the like, and drives and rotates the drive wheel. As shown in FIG. 1, the rotational electric machine 1 includes a stator 10 which generates a rotation magnetic field in response to an alternating current, a rotor 20 which rotates in response to a rotation magnetic field, a field coil 30 which excites the rotor 20 in response to a direct current, and an inverter 40.

The stator 10 is disposed on the outer circumference centered on the rotation shaft 7 and is configured irrotationally around the rotation shaft 7. The rotor 20 is disposed on the inner circumference of the stator 10 and is configured rotatably around the rotation shaft 7. The field coil 30 is disposed on one side in the rotation shaft direction of the rotor 20 with respect to the rotor 20 and is configured irrotationally around the rotation shaft 7.

A first air gap 13 is formed between the stator 10 and the rotor 20 to deliver magnetic flux between the stator 10 and the rotor 20. In addition, a second air gap 14 is formed between the field coil 30 and the rotor 20 to deliver magnetic flux between the field coil 30 and the rotor 20. That is, the field coil 30 is arranged in a row with the rotor 20 to be shifted in the shaft direction of the rotation shaft 7 with the second air gap 14 provided therebetween.

In addition, a permanent magnet (not shown) is arranged inside the rotor 20. Ferrite magnets, SmCo magnets, AlNiCo magnets, neodymium bonded magnets, or the like can be used as permanent magnets.

The inverter 40 converts the power supply voltage of the battery 3 and inputs a direct current and a multiple-phase alternating current into the rotational electric machine 1. The inverter 40 includes an inverter control unit 41 including a motor characteristic control unit 42 and a rotation magnetic field control unit 43.

The inverter control unit 41 includes a CPU for performing calculations and the like, a storage medium such as a ROM and a RAM for storing programs, data, or the like to control the rotational electric machine 1, and an interface unit for inputting and outputting data with the outside. The motor characteristic control unit 42 and the rotation magnetic field control unit 43 have functions achieved in the inverter control unit 41 by the CPU of the inverter control unit 41 executing a predetermined program.

The motor characteristic control unit 42 controls the direct current based on the manipulation information and the rotational state of the rotor 20, which are acquired by the acquisition unit 50 of the drive control unit 2 described below, to control the motor characteristic. The motor characteristic control unit 42 can freely set the application direction of direct current in an increase direction of the magnetic force of the rotor 20 caused by the permanent magnet and/or in a decrease direction of the magnetic force of the rotor 20 caused by the permanent magnet. Here, the motor characteristic refers to an output characteristic regarding the relationship between torque, rotational speed, and current obtained when the rotational electric machine 1 is operated as a motor (that is, an electric motor).

The rotation magnetic field control unit 43 controls the alternating current based on the manipulation information and the rotational state of the rotor 20, which are acquired by the acquisition unit 50, to control the rotation magnetic field of the rotational electric machine 1. Thereby, torque is generated in the rotor 20. For example, when the rotation magnetic field control unit 43 performs PWM control on the power supply voltage of the battery 3, the frequency and the amplitude of a multiple-phase alternating current to be input into the rotational electric machine 1 can be changed. The multiple-phase alternating current to be input into the stator 10 is controlled by the rotation magnetic field control unit 43, whereby the rotation magnetic field generated by the stator 10 being magnetized is controlled, and the speed and torque at which the rotor 20 rotates with respect to the stator 10 change. Therefore, based on the manipulation information acquired by the acquisition unit 50, the rotation magnetic field control unit 43 can change the output torque of the rotational electric machine 1 so as to approach the requested torque of the manipulator (for example, the driver of a vehicle). The rotation magnetic field control unit 43 may perform field weakening control on the rotational electric machine 1 by further performing vector control on the multiple-phase alternating current.

The battery 3 supplies power to the rotational electric machine 1 and the drive control unit 2.

The manipulation unit 4 accepts manipulation such as accelerator manipulation of the driver.

The drive control unit 2 controls the drive of the EV by outputting a manipulation command to each unit constituting the drive control system 100 based on the manipulation or the like accepted by the manipulation unit 4. The drive control unit 2 includes an acquisition unit 50.

The acquisition unit 50 acquires manipulation information from the manipulation unit 4 and acquires the rotational state of the rotational electric machine 1 (that is, the rotor 20) via the inverter 40 from the rotation angle or the like detected by a rotor angle sensor 5 disposed in the vicinity of the rotational electric machine 1. Specifically, the acquisition unit 50 acquires, as manipulation information, the accelerator manipulation amount, accelerator manipulation speed, and the like of the driver based on the manipulation or the like accepted by the manipulation unit 4. The acquisition unit 50 estimates the requested torque of the manipulator from the acquired manipulation information. The acquisition unit decides the torque generated by or caused to be generated by the rotor 20 from the estimated requested torque and the rotational state of the rotor 20. That is, the acquisition unit 50 acquires manipulation information on the torque generated by or caused to be generated by the rotor 20 and the rotational state of the rotor 20.

The drive control unit 2 includes a CPU for performing calculations and the like, a storage medium such as a ROM and a RAM for storing programs, data, or the like to control the drive control system 100, and an interface unit for inputting and outputting date with the outside. The acquisition unit 50 has a function achieved in the drive control unit 2 by the CPU of the drive control unit 2 executing a predetermined program.

Here, with reference to FIGS. 2 to 5, a control example of a motor characteristic in the drive control system 100 will be described. FIGS. 2 to 5 are diagrams for illustrating motor characteristics achieved by control of direct current by the motor characteristic control unit 42. Hereinafter, "positive direct current" is defined as "direct current in the application direction increasing the magnetic force by the permanent magnet provided in the rotor 20", and "negative direct current" is defined as "direct current in the application direction decreasing the magnetic force by the permanent magnet".

Figure 2:
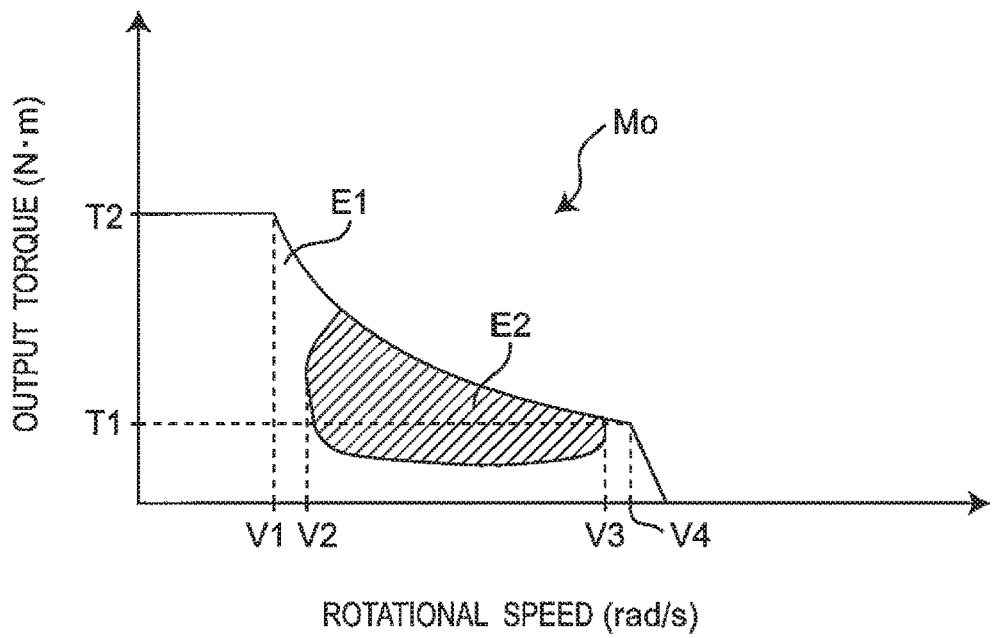
FIG. 2 is a first graph for illustrating control processing of the drive control system in FIG. 1.

The first motor characteristic Mo shown in FIG. 2 is a motor characteristic when direct current is controlled so that the value of the direct current for energizing the field coil 30 reaches an intermediate value between the upper limit value and the lower limit value (that is, a set value). In the case of the rotational electric machine 1, the first motor characteristic Mo is a motor characteristic in a state in which, for example, the motor characteristic control unit 42 sets the value of the direct current to zero and only the permanent magnet excites the rotor 20. In the state of motor characteristic Mo, the rotational electric machine 1 can change the operating point within the range E1 with the control of the rotation magnetic field in the rotation magnetic field control unit 43, that is, the control of the frequency and the amplitude (effective current) of the multiple-phase alternating current to be input into the rotational electric machine 1. The output torque can take the range from zero to the maximum value T2 while the rotational speed of the rotational electric machine 1 is relatively low from zero to V1. When the rotational speed is higher than V1, the upper limit value of the output torque gradually decreases from the maximum value T2, and when the rotational speed is V4, the upper limit value of the output torque decreases to T1. When the rotational speed becomes higher than V4, the upper limit value of the output torque sharply decreases from T1 to almost zero.

The operating efficiency of the rotational electric machine 1 (that is, motor efficiency) differs depending on the operating point in the range E1, and distributes so as to draw a contour line in the range E1. For example, the range E2 having a predetermined high operating efficiency or more is limited to a partial region in the range E1. Normally, in the motor characteristic Mo of the rotational electric machine 1, higher operating efficiency can be obtained between the rotational speed V2 higher than the rotational speed V1 at which the upper limit of the output torque starts to decrease and the rotational speed V3 lower than the rotational speed V4 at which the upper limit of the output torque sharply decreases. The operating efficiency of the rotational electric machine 1 (that is, motor efficiency) is represented by the ratio of the mechanical output (W) from the rotational electric machine 1 to the input power (W) into the rotational electric machine 1.

Figure 3:
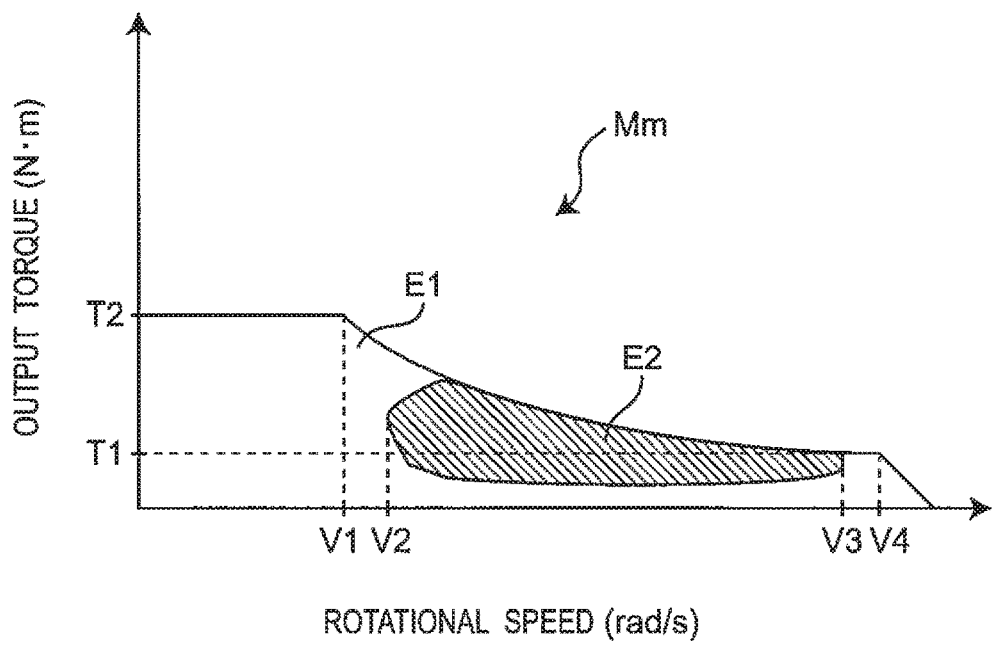
FIG. 3 is a second graph for illustrating control processing of the drive control system in FIG. 1.

The motor characteristic Mm shown in FIG. 3 is a motor characteristic when the direct current is controlled so that the value of the direct current reaches the lower limit (for example, a negative value), that is, a motor characteristic in a state where the magnetic force of the rotor 20 is reduced. The motor characteristic Mm has a maximum value T2 of output torque lower than that of the motor characteristic Mo. On the other hand, the motor characteristic Mm has a maximum rotational speed V4 higher than that of the motor characteristic Mo. In the rotational electric machine 1, when the direct current for energizing the field coil 30 is controlled to be negative, the amount of magnetic flux by the permanent magnet is equivalently reduced, and the torque constant and the induced voltage constant of the rotational electric machine 1 are reduced. Thus, the motor characteristic Mm has a reduced maximum value T2 of output torque of the rotational electric machine 1, and on the other hand, can have an increased maximum rotational speed V4, as compared with those of the motor characteristic Mo.

Figure 4:
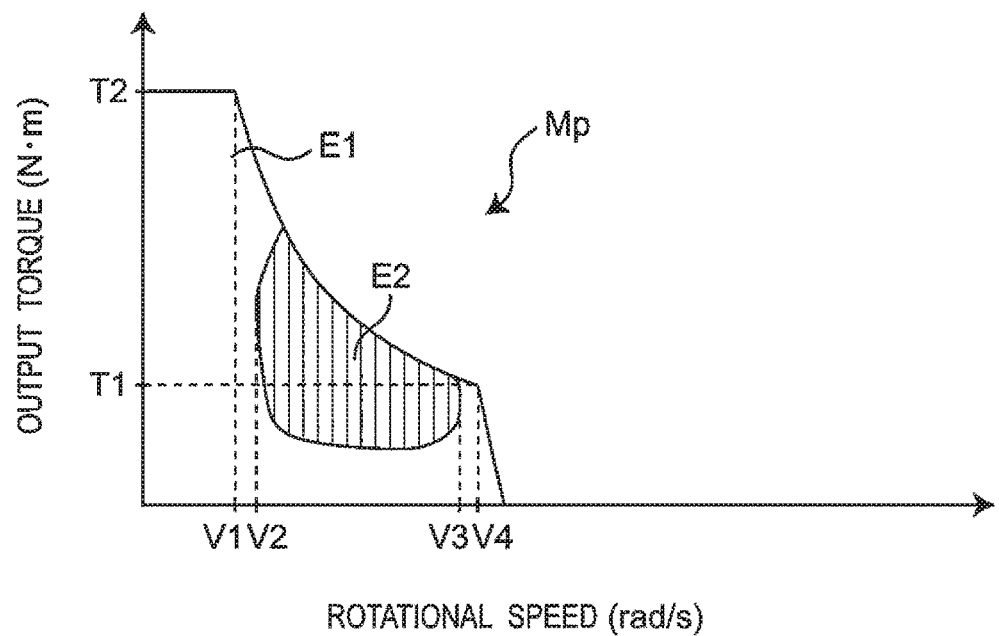
FIG. 4 is a third graph for illustrating control processing of the drive control system in FIG. 1.

In addition, the motor characteristic Mp shown in FIG. 4 is a motor characteristic when the direct current is controlled so that the value of the direct current reaches the upper limit (for example, a positive value), that is, a motor characteristic in a state where the magnetic force of the rotor 20 is increased. The motor characteristic Mp has a reduced maximum rotational speed V4 but an increased maximum value T2 of output torque, as compared with those of the motor characteristic Mo. In the rotational electric machine 1, when the direct current for energizing the field coil 30 is controlled to be positive, the amount of magnetic flux by the permanent magnet is equivalently increased, and the torque constant and the induced voltage constant of the rotational electric machine 1 is increased. Thus, the motor characteristic Mp has a reduced maximum rotational speed V4 of the rotational electric machine 1, but can have an increased maximum value T2 of output torque, as compared with those of the motor characteristic Mo.

Figure 5:
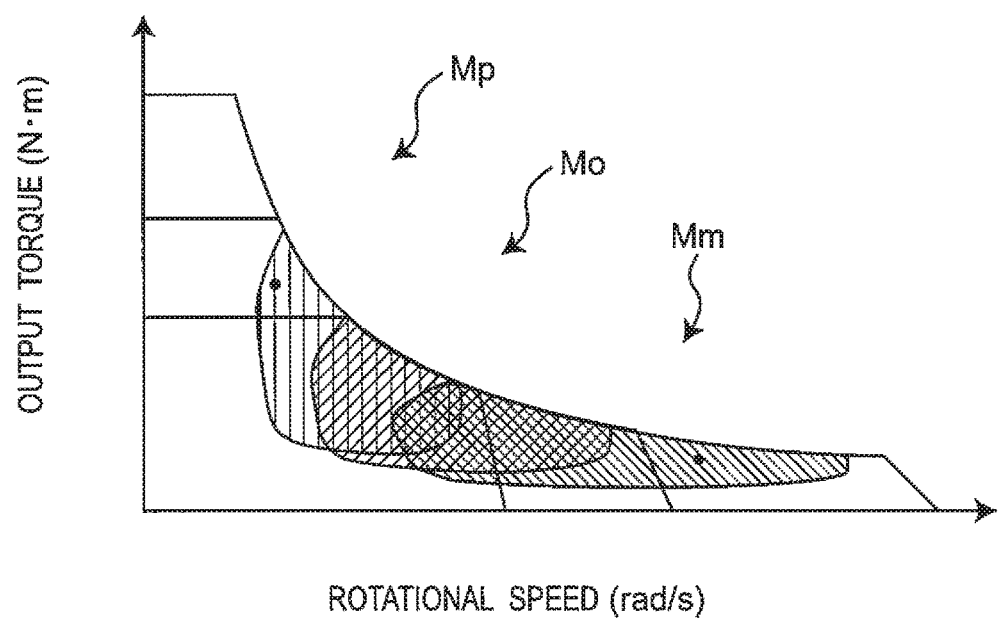
FIG. 5 is a fourth graph for illustrating control processing of the drive control system in FIG. 1.

Therefore, the motor characteristic control unit 42 can vary the motor characteristic between the waveform of the motor characteristic Mm shown in FIG. 3 and the waveform of the motor characteristic Mp shown in FIG. 4 by setting the value of the direct current for energizing the field coil 30 to any value from the upper limit to the lower limit and controlling the direct current so that the value of the direct current reaches the set value. Therefore, as shown in FIG. 5, the equivalent motor characteristic Mx to be achieved by control of direct current is a motor characteristic having both an increased maximum value of the rotational speed and an increased maximum value of output torque such that the motor characteristics Mm, Mo, and Mp in FIGS. 2 to 4 are superimposed on each other. Thus, in the drive control system 100 and the rotational electric machine 1, the output characteristic as a vehicle can be changed by changing the motor characteristic even without using a plurality of gear pairs or a mechanical transmission.

Next, with reference to FIG. 6, an example of control processing of a motor characteristic in the drive control system 100 will be described. It should be noted that the processing described below is implemented by the drive control unit 2 and the inverter control unit 41 executing a predetermined program.

Figure 6:
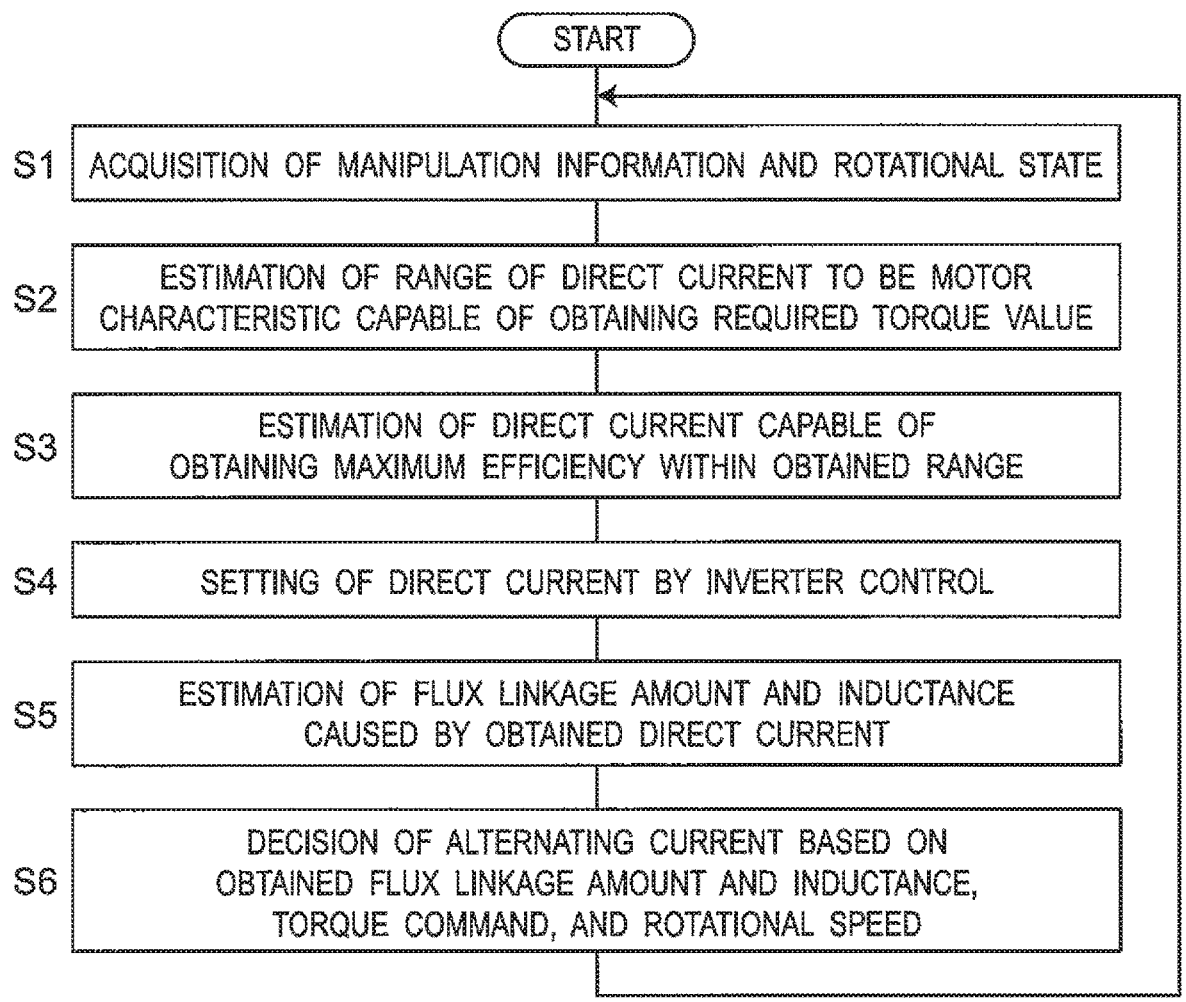
FIG. 6 is a flowchart for illustrating control processing of the drive control system in FIG. 1.

As shown in FIG. 6, first, the acquisition unit 50 acquires manipulation information on the torque generated by or caused to be generated by the rotor 20 and the rotational state of the rotor 20 (step S1). Then, the acquisition unit 50 sets a manipulation command (torque command) indicating a torque generated by or caused to be generated by the rotor 20 based on the acquired manipulation information and the rotational state of the rotor 20, and outputs the set torque command to the motor characteristic control unit 42.

Next, based on the torque command obtained from the acquisition unit 50, the motor characteristic control unit 42 estimates the range of the direct current from which the motor characteristic capable of achieving the combination of the required torque value and the rotational speed can be obtained (step S2). The estimation processing of direct current in step S2 can be achieved by various methods. For example, the estimation processing of direct current may be performed by acquisition as mapping data stored in advance in the memory, and may be performed by acquisition as an operation result by a predetermined arithmetic expression or as information from the outside. In addition, the above-mentioned acquisition methods may be combined.

Subsequently, the motor characteristic control unit 42 grasps the relationship between the direct current corresponding to the manipulation information and the rotational state of the rotor 20 acquired by the acquisition unit 50, and the evaluation value. In addition, the motor characteristic control unit 42 estimates the value of the direct current at which the evaluation value is maximum (that is, the set value) in the range of the direct current estimated in step S2 (step S3). The evaluation value is a map data, a mathematical expression, or the like as a set of evaluation values acquired in advance by evaluation, and here, is the motor efficiency corresponding to the manipulation information and the rotational state of the rotor 20 acquired by the acquisition unit 50. Then, the motor characteristic control unit 42 controls the inverter 40 so that the direct current for energizing the field coil 30 is at a set value (step S4). This estimation may also be performed by acquisition as mapping data stored in advance in the memory, and may be performed by acquisition as an operation result by a predetermined arithmetic expression or as information from the outside. In addition, the above-mentioned acquisition methods may be combined. When the value of the optimum direct current fluctuates, the motor characteristic control unit 42 can also be configured to approach the optimum value by learning. Furthermore, an index other than the motor efficiency may be used as the evaluation value, and for example, the motor output may be used as the index. The motor output is represented by the maximum value of the mechanical output (W) that the rotational electric machine 1 can take, and is decided according to the value of the direct current for energizing the field coil 30. In addition, an index that maximizes the sensory characteristics such as vibration or acceleration felt by the driver can also be used as the evaluation value.

In order to notify the rotation magnetic field control unit 43 of the motor characteristics set in steps S1 to S4, the motor characteristic control unit 42 estimates the flux linkage amount to the rotor 20 and the inductance generated by the field coil 30 (step S5) and outputs the estimated flux linkage amount and inductance to the rotation magnetic field control unit 43. This estimation may also be performed by acquisition as mapping data stored in advance in the memory, and may be performed by acquisition as an operation result by a predetermined arithmetic expression or as information from the outside. The motor characteristic control unit 42 may output the value of direct current, identification information indicating the motor characteristic, or the like, instead of the flux linkage amount, to the rotation magnetic field control unit 43.

The rotation magnetic field control unit 43 performs the control of alternating current based on the motor characteristic grasped from the flux linkage amount and the inductance obtained from the motor characteristic control unit 42, the requested torque value required to be generated by the rotor 20 grasped from the torque command, and the rotational speed grasped from the rotor angle sensor (S6). When step S6 ends, the process returns to acquisition step S1 again, and the control processing of the acquisition step (step S1) and the motor characteristic control step (steps S2 to S6) is repeated at constant timings.

The drive control system 100 and the rotational electric machine 1 of the present invention can be implemented by performing the control processing as illustrated above. The program and non-transitory storage medium of the present invention can be configured to be read by each of the control unit of the rotational electric machine 1 (for example, the inverter control unit 41) and the control unit of the drive control system (for example, the drive control unit 2), and cause the control units to perform the control processing illustrated above. As the storage medium, various storage media such as a ROM, a RAM, a HDD, a USB memory, a compact disc, and a magnetic medium can be applied.

Other Embodiments

Figure 7:
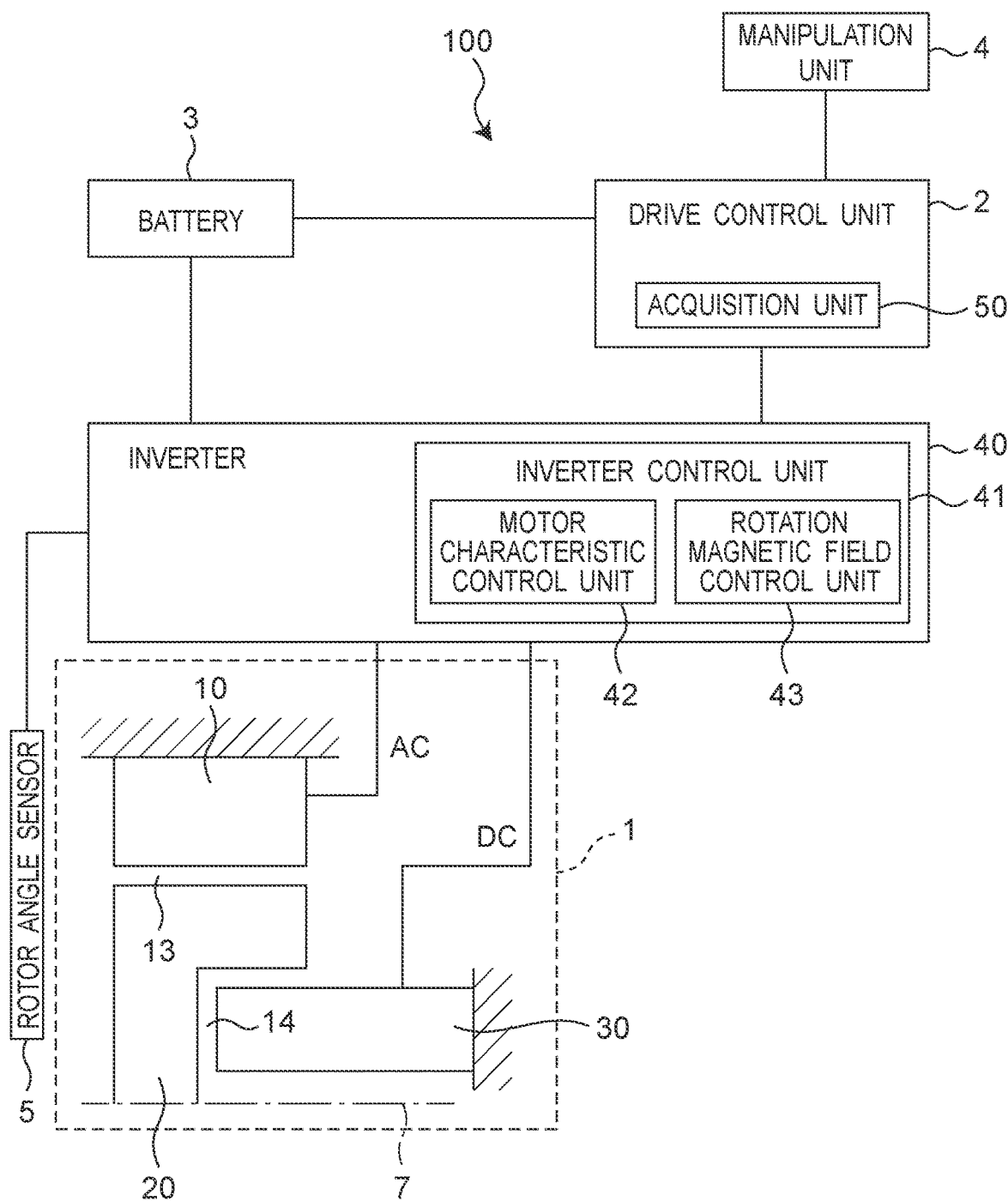
FIG. 7 is an explanatory diagram showing a configuration of a drive control system according to a second embodiment of the present invention.

The rotational electric machine 1 can adopt not only the configuration shown in FIG. 1 but also, for example, the configuration shown in FIG. 7 (a second embodiment). That is, the field coil 30 may be disposed, for example, on the inner circumference of the rotor 20 with respect to the rotor 20.

In FIG. 7, the inverter 40 and the rotor angle sensor 5 are provided separately from the rotational electric machine 1. That is, the inverter 40 and the rotor angle sensor 5 can be configured separately from the rotational electric machine 1.

Figure 8:
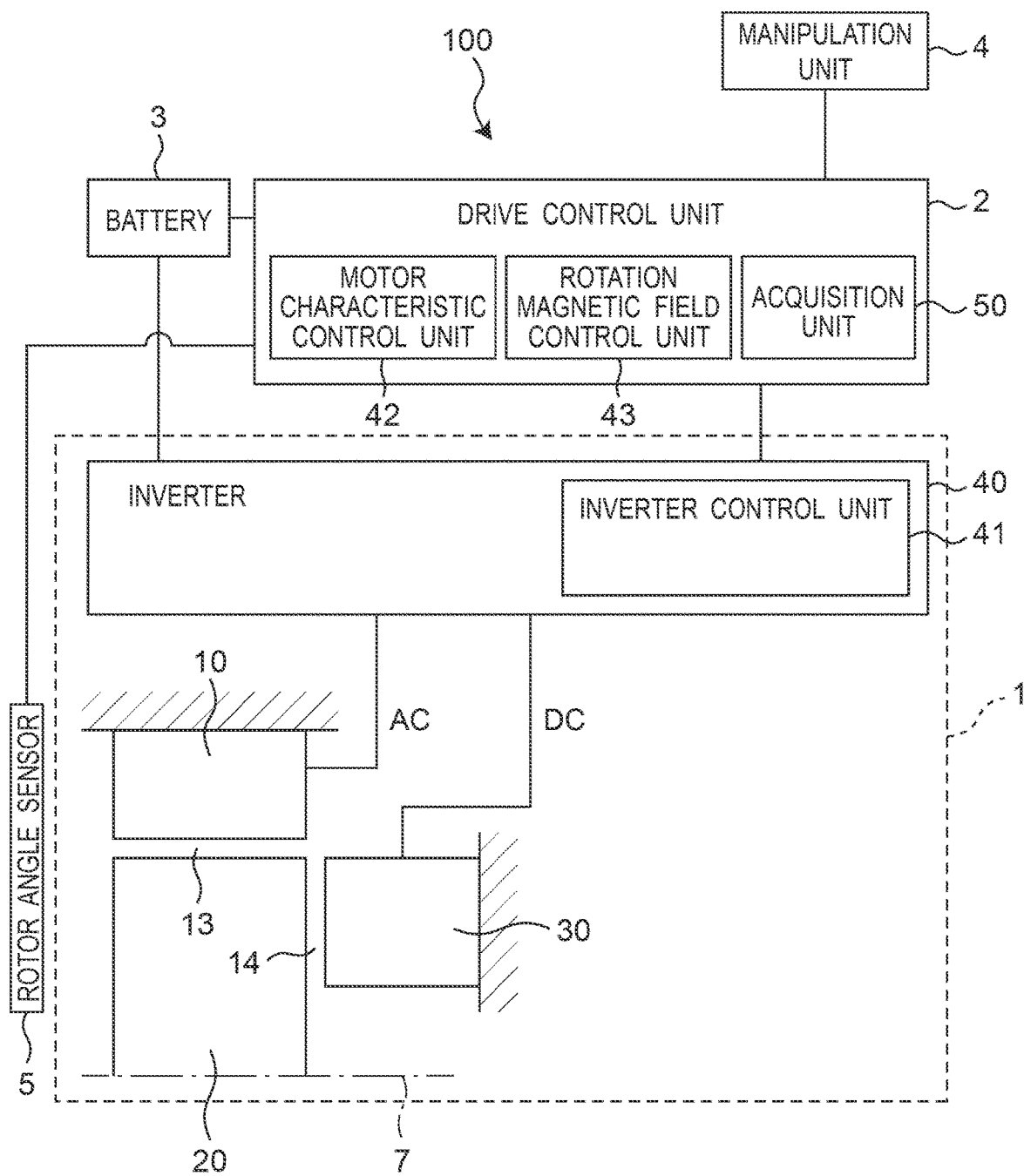
FIG. 8 is an explanatory diagram showing a configuration of a drive control system according to a third embodiment of the present invention.
Figure 9:
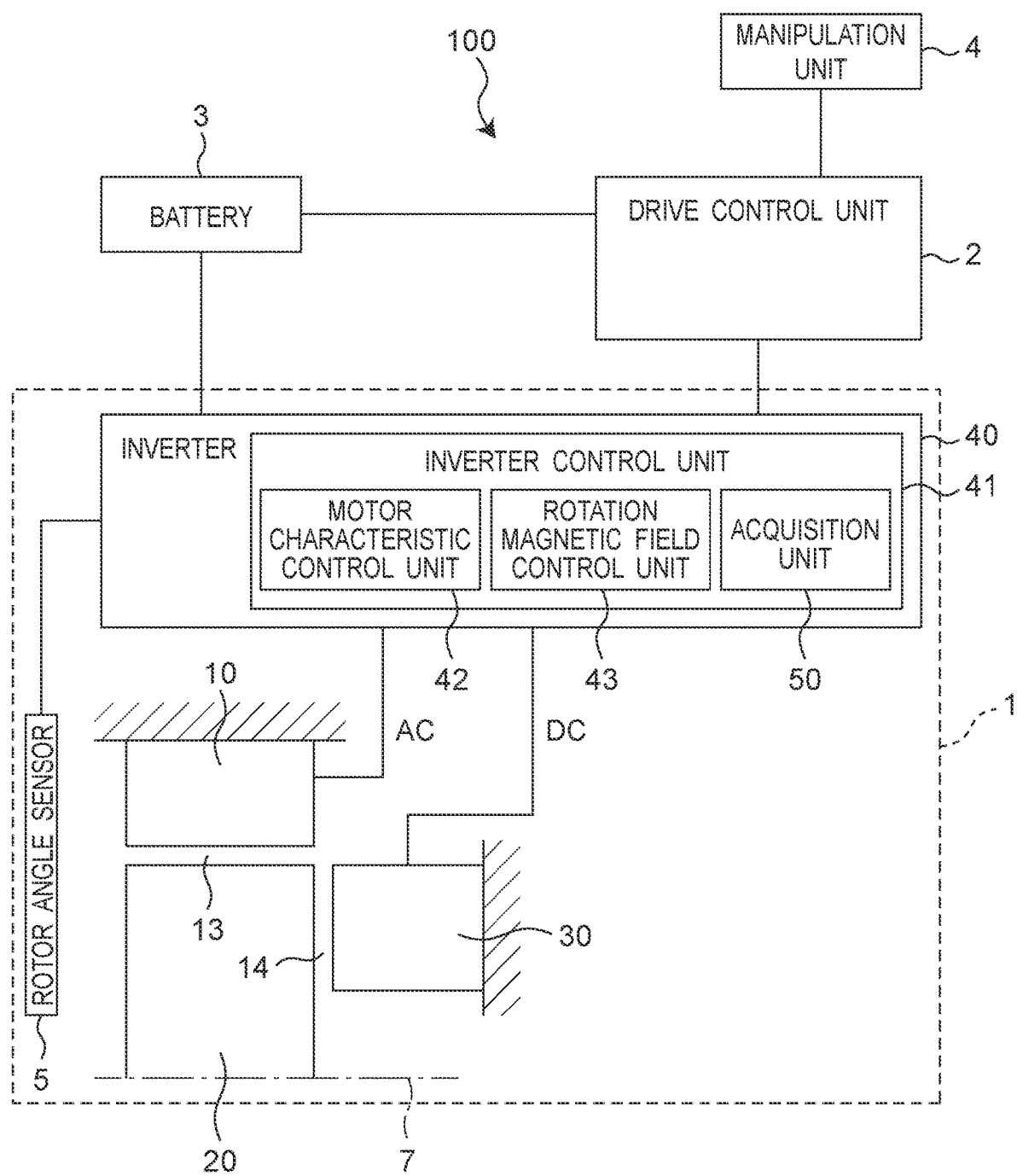
FIG. 9 is an explanatory diagram showing a configuration of a drive control system according to a fourth embodiment of the present invention.

The motor characteristic control unit 42, the rotation magnetic field control unit 43, and the acquisition unit 50 are not limited to the configuration shown in FIG. 1. For example, the motor characteristic control unit 42, the rotation magnetic field control unit 43, and the acquisition unit 50 may be provided in the drive control unit 2 as shown in FIG. 8 (third embodiment), may be provided in the inverter control unit 41 as shown in FIG. 9 (fourth embodiment), and may be provided in another control unit 102 provided separately from the drive control unit 2 and the inverter control unit 41 as shown in FIG. 10 (fifth embodiment).

Figure 10:
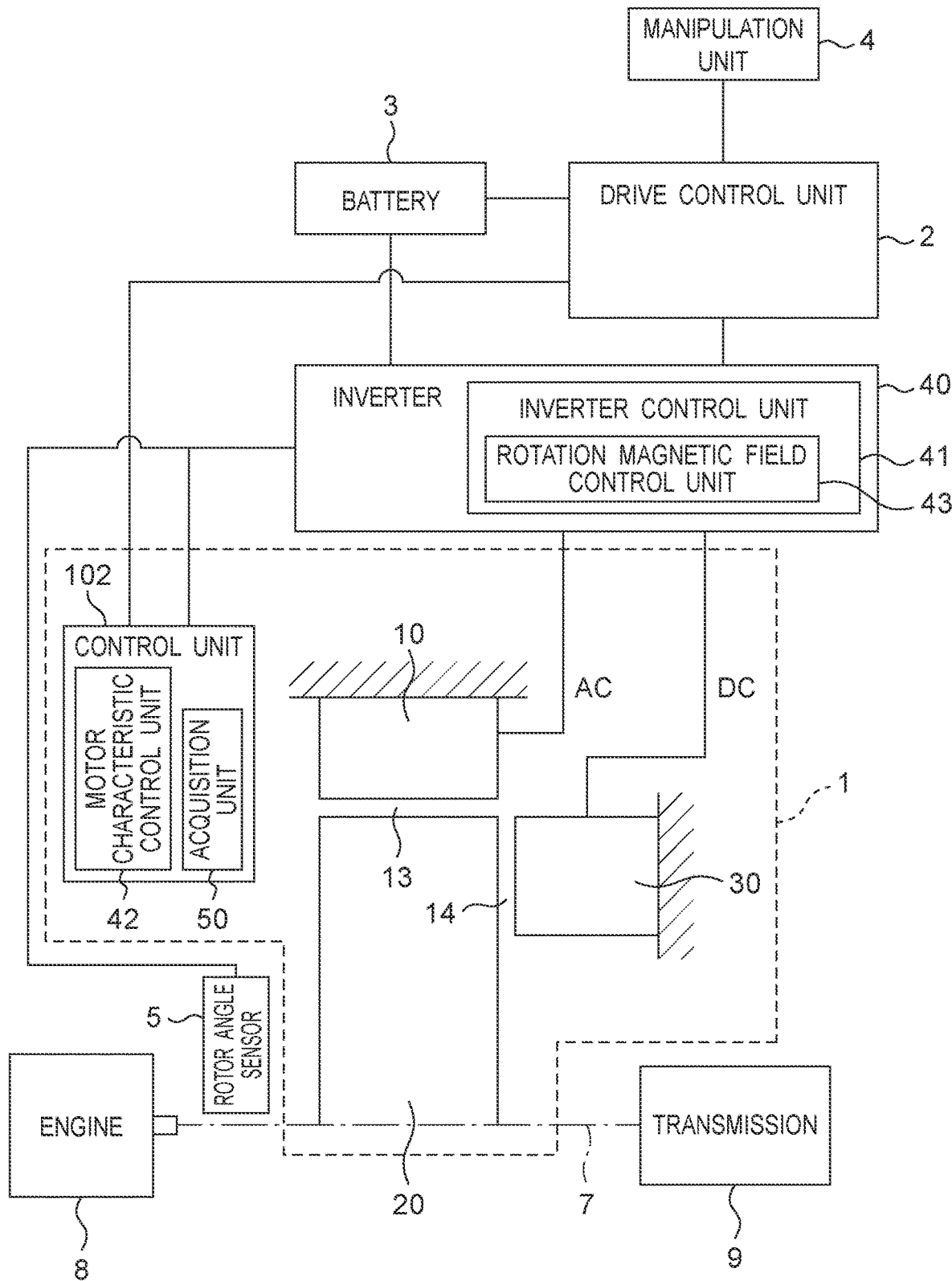
FIG. 10 is an explanatory diagram showing a configuration of a drive control system according to a fifth embodiment of the present invention.

FIG. 10 shows, as an example, the drive control system 100 and the rotational electric machine 1 in the case of being applied to a hybrid electric vehicle (HEV) with a combined use of a torque converter. In FIG. 10, the rotational electric machine 1 is disposed between the engine 8 and the transmission 9 along the rotation shaft 7. The rotational electric machine 1 according to the fifth embodiment includes a stator 10, a rotor 20, a field coil 30, and a control unit 102 including an acquisition unit 50 and a motor characteristic control unit 42. The rotation magnetic field control unit 43 is provided in the inverter control unit 41 of the inverter 40 and is not provided in the rotational electric machine 1. In the fifth embodiment, the rotor 20 may be integrally configured with the torque converter. In this case, for example, the rotor 20 is configured by attaching a magnetic pole member to be the rotor 20 to a casing of the torque converter.

In each of the embodiments described above, since the field coil 30 generates the magnetic force similar to that of a permanent magnet, the rotor 20 does not necessarily include a permanent magnet. When the rotor 20 is not provided with a permanent magnet, the motor characteristic can be changed as in FIGS. 2 to 4 by changing the magnitude of the direct current flowing in one direction. It should be noted that when the permanent magnet is provided, the torque generated by or caused to be generated by the rotor 20 can be relatively increased as compared with the case where the permanent magnet is not provided.

It should be noted that appropriately combining any embodiment or modification out of the various embodiments or modifications allows the effect of each embodiment or modification to be exhibited. In addition, a combination of the embodiments, a combination of the examples, or a combination of the embodiment and the example is possible, and a combination of the features out of different embodiments or the examples is also possible.

The present invention can be applied to, for example, a control method for a vehicle drive motor, a program for controlling a vehicle drive motor, a storage medium storing a program for controlling a vehicle drive motor, and a control system for a vehicle drive motor.

REFERENCE SIGNS LIST

1: rotational electric machine
2: drive control unit
3: battery
4: manipulation unit
5: rotor angle sensor
7: rotation shaft
10: stator
13: first air gap
14: second air gap 14
20: rotor
30: field coil
40: inverter
41: inverter control unit
42: motor characteristic control unit
43: rotation magnetic field control unit
50: acquisition unit
100: drive control system
T1, T2: output torque
V1, V2, V3, V4: rotational speed
E1, E2: range
Mo, Mm, Mp: motor characteristic

What is claimed is:
1. A rotational electric machine comprising:
a stator configured to generate a rotation magnetic field in response to alternating current;
a rotor configured to rotate in response to the rotation magnetic field, the rotor including a permanent magnet;
a field coil configured to excite the rotor in response to direct current;
an acquisition unit configured to acquire manipulation information related to a torque generated by or caused to be generated by the rotor and a rotational state of the rotor; and
a motor characteristic control unit configured to control the direct current so as to change an application direction of the direct current to a first direction to increase a magnetic force of the rotor caused by the permanent magnet and a second direction to decrease the magnetic force of the rotor caused by the permanent magnet based on the manipulation information and the rotational state acquired by the acquisition unit to control a motor characteristic.

2. The rotational electric machine according to claim 1, wherein
the motor characteristic control unit calculates a relationship between the direct current corresponding to the manipulation information and the rotational state, which are acquired by the acquisition unit, and an evaluation value, and sets the direct current at which the evaluation value is maximized.

3. The rotational electric machine according to claim 2, wherein
the evaluation value relates to a motor efficiency corresponding to the manipulation information and the rotational state.

4. The rotational electric machine according to claim 2, wherein
the evaluation value relates to a motor output.

5. The rotational electric machine according to claim 1, further comprising
a rotation magnetic field control unit configured to control the rotation magnetic field.

6. A drive control system of a vehicle, the system comprising:
a rotational electric machine including a stator configured to generate a rotation magnetic field in response to alternating current, a rotor configured to rotate in response to the rotation magnetic field, and a field coil configured to excite the rotor in response to direct current, the rotor including a permanent magnet;
a manipulation unit configured to accept manipulation of the vehicle;
a rotation magnetic field control unit configured to control the rotation magnetic field based on manipulation accepted by the manipulation unit;
an acquisition unit configured to acquire manipulation information related to torque generated by or caused to be generated by the rotor from manipulation accepted by the manipulation unit, the acquisition unit being configured to acquire a rotational state from the rotor; and
a motor characteristic control unit configured to control the direct current so as to change an application direction of the direct current to a first direction to increase a magnetic force of the rotor caused by the permanent magnet and a second direction to decrease the magnetic force of the rotor caused by the permanent magnet based on the manipulation information and the rotational state, which are acquired by the acquisition unit, to control a motor characteristic.

7. The drive control system of a vehicle according to claim 6, wherein
the motor characteristic control unit calculates a relationship between the direct current corresponding to the manipulation information and the rotational state, which are acquired by the acquisition unit, and an evaluation value, and sets the direct current at which the evaluation value is maximized.

8. The drive control system of a vehicle according to claim 7, wherein
the evaluation value relates to a motor efficiency corresponding to the manipulation information and the rotational state.

9. The drive control system of a vehicle according to claim 7, wherein
the evaluation value relates to a motor output.

10. A non-transitory computer-readable storage medium storing a program for causing a control apparatus, which is configured to control a rotational electric machine including a stator configured to generate a rotation magnetic field in response to alternating current, a rotor configured to rotate in response to the rotation magnetic field, and a field coil configured to excite the rotor in response to direct current, to perform operations, the rotor including a permanent magnet, comprising:
an acquisition step of acquiring manipulation information related to torque generated by or caused to be generated by the rotor and a rotational state of the rotor; and
a motor characteristic control step of controlling the direct current so as to change an application direction of the direct current to a first direction to increase a magnetic force of the rotor caused by the permanent magnet and a second direction to decrease the magnetic force of the rotor caused by the permanent magnet based on the manipulation information and the rotational state, which are acquired, to control a motor characteristic.

11. The computer-readable storage medium according to claim 10, wherein
the motor characteristic control step includes calculating a relationship between the direct current corresponding to the manipulation information and the rotational state, which are acquired, and an evaluation value, and setting the direct current at which the evaluation value is maximized.

12. The computer-readable storage medium according to claim 11, wherein
the evaluation value relates to a motor efficiency corresponding to the manipulation information and the rotational state.

13. The computer-readable storage medium according to claim 11, wherein
the evaluation value relates to a motor output.

* * * * *